United States Patent

Biddison

[15] 3,705,459
[45] Dec. 12, 1972

[54] WAVE WINDING OF ARMATURES

[72] Inventor: John M. Biddison, Dayton, Ohio

[73] Assignee: The Globe Tool and Engineering Company, Dayton, Ohio

[22] Filed: June 24, 1971

[21] Appl. No.: 156,359

[52] U.S. Cl. .....................29/597, 29/598, 242/7.03, 242/7.05 B, 310/198, 310/207, 310/234
[51] Int. Cl. ................................................H01r 43/00
[58] Field of Search....29/596, 605, 597, 598, 205 R, 29/205 C; 242/7.03, 7.05 A, 7.05 B, 7.05 C, 7.05 R; 310/207, 203, 198, 233, 234, 236

[56] References Cited

UNITED STATES PATENTS

| 3,506,864 | 4/1970 | Miller | 310/234 |
| 3,448,311 | 6/1969 | Mommsen et al. | 310/234 |
| 2,756,354 | 7/1956 | Baron | 310/234 X |
| 2,627,379 | 2/1953 | Moore | 242/7.05 B |

Primary Examiner—Charles W. Lanham
Assistant Examiner—Carl E. Hall
Attorney—Henry G. Dybvig et al.

[57] ABSTRACT

Procedures are described for wave winding armatures to be used in dynamoelectric machines having four or more poles utilizing flier type armature winding machines. After the winding of each coil or pair of coils, the armature is rotated through 360 electrical degrees plus or minus the angle between adjacent armature slots to position the armature for the winding of the next coil or pair of coils. Intermediate the winding of coils by the same flier the lead wire connections are made to the commutator by looping the lead wires about hooks projecting from the commutator. All coils are wound with the flier or fliers rotating in the same direction.

3 Claims, 4 Drawing Figures

PATENTED DEC 12 1972
3,705,459
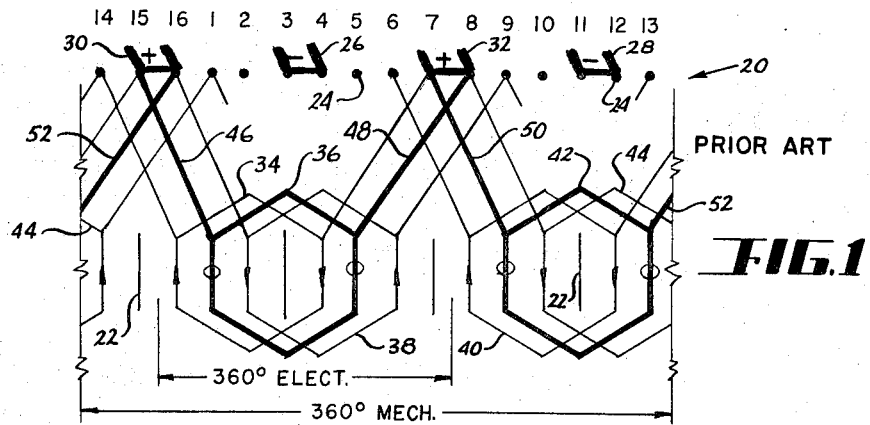
PRIOR ART
FIG.1
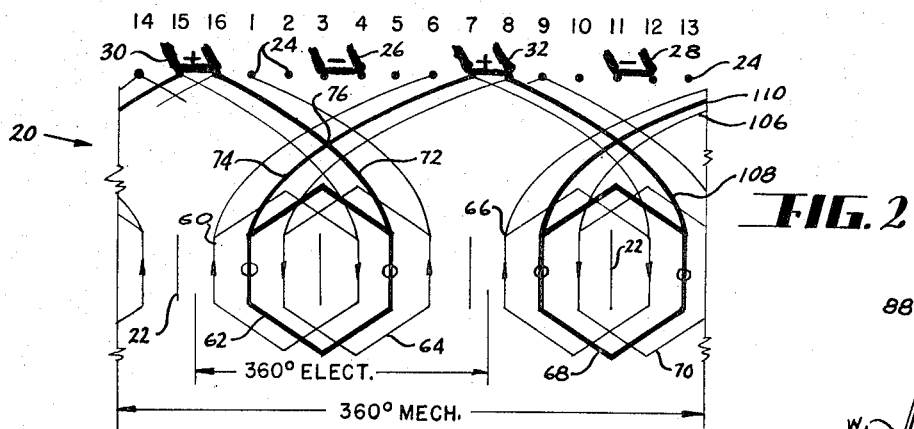
FIG.2
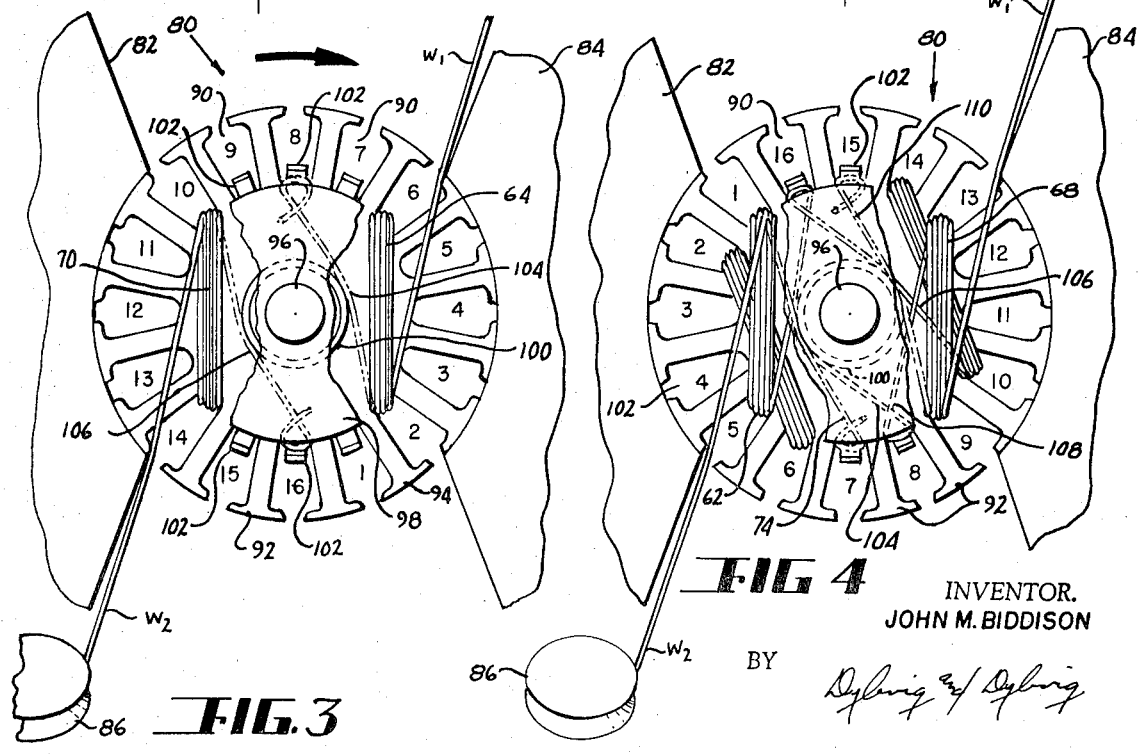
FIG.3
FIG.4
INVENTOR.
JOHN M. BIDDISON
BY
Dybvig and Dybvig
HIS ATTORNEYS

WAVE WINDING OF ARMATURES

BACKGROUND OF THE INVENTION

This invention relates to the wave winding of armatures for use in dynamoelectric machines having four or more poles.

Broadly speaking, armatures are either wave wound or lap wound depending upon the manner in which the lead wire connections are made to the commutator. In a typical lap wound armature the two lead wires to each coil are connected to adjacent commutator bars but in a wave wound armature the two lead wires to each coil are connected to commutator bars which are remote from one another by approximately 360 electrical degrees. For this reason among others flier type armature winding machines have not been thought adaptable to the wave winding of armatures. Flier type armature winding machines are in common usage for winding lap wound armatures for two-pole dynamoelectric machines. On occasion flier type armature winding machines may have been used for winding wave wound armatures. However, the wave winding would have been accomplished by forming lead loops between the successive coils wound by the flier or fliers such as described in the Moore U.S. Pat. No. 2,627,379, which issued Feb. 3, 1953, and the later severing of the lead loops to form wire leads which then would be manually connected to the commutator.

Winding procedures are described in the Miller U.S. Pat., No. 3,506,864, which issued Apr. 14, 1970, for winding armatures wherein, as conventional in lap wound armatures, both wire leads to each coil are connected to adjacent commutator bars. However, the wire leads are looped about the commutator hooks or tangs and the wire leads are also looped completely around the armature shaft. The procedures described in the Miller patent include the rotation of the armature through 360 mechanical degrees or else 360 mechanical degrees plus or minus the angle between adjacent armature slots between the winding of successive coils.

SUMMARY OF THE INVENTION

I have found that armatures suitable for use in four-pole or greater than four-pole dynamoelectric machines may be wave wound using either single or double flier armature winding machines and this invention is directed to the method of accomplishing wave winding with such machines. In accordance with this invention the armature coils are wound and the lead wire connections to the commutator bars are made during the armature winding cycle of a flier type armature winding machine following a procedure somewhat analagous to the procedure described in the aforementioned Miller patent.

Briefly, the wave winding is obtained by rotating the armature through an angle approximately equal to 360 electrical degrees after the winding of a first coil or pair of coils in preparation for the winding of the second coil or pair of coils. In practice, for a four-pole armature the actual rotation would be approximately 180 mechanical degrees and it will either be 180° plus the number of degrees between adjacent armature slots or else less the number of degrees between adjacent armature slots. For a six-pole armature, the mechanical rotation would similarly be on the order of 120°. Although the connections to the commutator bars could be made in other ways, the procedure of looping the lead wires completely about commutator tangs or hooks, as described in the aforementioned Miller patent, is preferred. The selected hooks or tangs to which a given lead wire is connected are intermediate the finish end of one coil and the start end of the next coil wound by the same flier.

It is presently believed that the most useful application of this invention is in connection with the winding of four-pole armatures by automatic double flier armature winding machines. When winding such armatures the adjacent overlapping coils are wound by opposite fliers and entirely conventional machine control circuitry is adapted to the full automatic winding of such armatures. As will become apparent, the invention may be practiced on armatures having an even number of slots with very few modifications in the tooling of an automatic double flier armature winding machine but the invention may also be practiced on armatures having odd numbers of slots.

Other objects and advantages will become apparent from the following description and the drawings.

BRIEF DESCRIPTION OF THE DRAWINGS

FIG. 1 is a schematic wiring diagram of an armature partially wound with a conventional prior art wave winding pattern.

FIG. 2 is a schematic wiring diagram of an armature which may be the same armature as schematically represented in FIG. 1 but with a partial wave winding in accordance with this invention.

FIG. 3 is an end view of an armature with portions of the armature broken away, and portions of the tooling of a double flier armature winding machine, and illustrating one stage in the winding of the armature in accordance with this invention.

FIG. 4 is an end view similar to FIG. 3 but showing the parts at a later stage in the practice of the method of this invention.

DESCRIPTION OF THE PREFERRED EMBODIMENT

FIG. 1 diagrammatically illustrates an armature generally designated 20 having 16 coil receiving slots represented by vertical lines 22 and 16 commutator bars represented by small circles 24. The slots 22 and the commutator bars 24 are labeled 1 through 16 along the top of the diagram. Also schematically illustrated in FIG. 1 are four brushes representing four poles of a motor and including negative brushes 26, 28 and positive brushes 30, 32. As indicated on FIG. 1, the span of the complete diagram represents 360 mechanical degrees. That is, the same point on the armature is illustrated at the extreme left and the extreme right side of FIG. 1. The span of 360 electrical degrees is also indicated, such being the span from one pole to another pole of the same polarity. In the case of the four-pole armature illustrated, 360 electrical degrees spans 180 mechanical degrees or one-half the armature.

In a complete wave wound armature having 16 slots and 16 commutator bars, there would be 16 coils wound in the slots. However, to avoid a confusion of lines the diagram of FIG. 1 shows only six of the coils, these coils being identified by reference characters 34, 36, 38, 40, 42 and 44. Following conventional practice, the direction of current flow (conventionally from positive brush to negative brush) through each of the coils is represented by an arrow in each of the slots 22 containing a coil side. The coils shorted out or "commutated" by the brushes are represented by heavy lines with circles surrounding the coil slot sides. That is, in FIG. 1 the coils 36 and 42 are the commutated coils.

The connection of the wire leads between the coils and the commutator bars in the conventional pattern shown in FIG. 1 are readily apparent. Thus, for example, the commutated coil 36 has coil sides located in slots 1 and 5 and a lead wire 46 extending between commutator bar 15 and slot 1 and another lead wire 48 extending between slot 5 and commutator bar 8. The other commutated coil 42 has its sides located in armature slots 9 and 13 with one lead wire 50 extending to slot 9 from commutator bar 7 and the other lead wire 52 extending between commutator bar 16 and armature slot 13. Thus both commutated coils 36 and 42 at the instant of operation represented by the diagram in FIG. 1 are directly connected to the positive brushes 30 and 32. Of course in the complete armature there would be two other commutated coils at the same instant shorted to the negative brushes 26 and 28. As necessary, direction of current flow of the coils on opposite sides of the commutated coils, such as the coils 34 and 38 which are adjacent the commutated coil 36, is opposite.

As apparent from FIG. 1, the wire leads to the coils, such as the leads 46 and 48, extend in opposite directions around the armature shaft to the commutator bars 24 and each coil is thus connected to commutator bars which are remote from rather than adjacent one another. Because of this feature it has been considered impractical to attempt to use flier type armature winding machines to wind wave wound armatures.

FIG. 2 is a wiring diagram for an armature which may be mechanically constructed the same as the armature illustrated in FIG. 1 and, accordingly, like parts are given like reference characters. Thus the armature, generally designated 20, includes slots represented by vertical lines 22, commutator bars represented by small circles 24 and the brushes are represented at 26,28 and 30,32. The slots and bars are again numbered 1 through 16 in FIG. 2. As in FIG. 1, six coils are represented in FIG. 2, these coils being designated by reference characters 60, 62, 64, 66, 68 and 70. Although upon inspection it is apparent that the lead wire connections to the coils 60 through 70 in FIG. 2 are different from the lead wire connections to the coils 34 through 44 it will be observed that the commutated coils 62 and 68 in FIG. 2 are located identically to the commutated coils 36 and 42 in FIG. 1. Also, the current flow through coils resulting from the winding pattern of FIG. 2 is in the same direction as the current flow through the corresponding coils in FIG. 1. Therefore the two winding patterns are electrically identical.

The wire lead 46 for the commutator coil 36 in FIG. 1 may be considered to be the start wire and the wire lead 48 the finish wire for the same coil. It will be noted that wire lead 46 enters slot 1 which is the slot for that coil closest to the commutator bar to which the lead 46 is connected. The finish wire 48 correspondingly is directed from slot 5 to the commutator bar to which it is closest. In FIG. 2, however, the commutator coil 62 has a start wire lead 72 which extends beyond slot 1 over into slot 5. The finish wire, which is designated 74, extends from slot 1 past slot 5 to the commutator bar 7. The start and finish wires cross each other at a crossover point designated 76. As a result, both the start wire 72 and the finish wire 74 in accordance with this invention are coursed through a considerable arc around the armature shaft and are drawn quite close to the shaft. As will become more apparent below, the coil 62 may be wound by a rotating flier which, during the winding of coils, always rotates in a single direction. The wire leads such as those at 72 and 74 may be obtained by the indexing or rotation of the armature about its shaft, always in a single predetermined direction.

Referring to FIGS. 3 and 4 an armature 80 is shown received between a pair of winding forms 82 and 84 of a double flier armature winding machine. The fliers are schematically represented by a left hand flier pulley 86 and a right hand flier pulley 88. The slots 90 of the armature 80 are separate by teeth 92 and are numbered 1 through 16 in FIGS. 3 and 4 to correspond to the slot numbering in FIG. 2. The slots 90 and teeth 92 are part of an armature core 94 mounted upon an armature shaft 96 upon which a commutator 98 is also mounted. The core 94 and commutator 98 are separated by an enlarged diameter portion of the shaft 96 which is surrounded by an insulating sleeve 100. The separate commutator bars are not illustrated in FIGS. 3 and 4 but each bar has a commutator tang or hook 102 extending from the face of the commutator 98 closest to the core 94 and generally radially outwardly from the longitudinal axis of the shaft 96.

Those familiar with armatures will appreciate that the construction of the armature 80 is entirely conventional. Furthermore, the construction of the armature winding machine of which the winding forms 82 and 84 and the wire pulleys 86 and 88 are a part may be entirely conventional provided that they incorporate the usual flier drive for rotating the fliers to wind coils, a mechanism for rotating the armatures through the desired angles between the winding of coils, and other mechanisms for connecting the wire leads to the commutator bars. The latter mechanisms could include commutator shielding devices (not shown) such as described in the aforementioned Miller patent which, upon suitable rotation of the armature and movements of the fliers, assist in causing the lead wires to be looped about the commutator hooks or tangs.

The procedure for winding the armature 80 in accordance with the winding pattern shown in FIG. 2 is as follows. During the winding of a pair of coils, the armature 80 is held in a fixed position between the winding forms 82 and 84. In the example shown in FIGS. 3 and 4 the right hand flier represented by the flier pulley 88 is rotated in what is known as the "top going" direction and the left hand flier represented by the pulley 86 is rotated in the "top coming" direction. FIG. 3 shows the position of parts at the end of the winding of a first pair of coils, one by each of the fliers. The coil wound by the right hand flier is designated 64 to conform to the coil 64 illustrated on the winding diagram of FIG. 2. The lead wire between commutator bar 1, which is aligned with slot 1 in FIGS. 2 and 3, which lead wire extends to slot 6, is not illustrated, it being understood that the first lead wire could be connected automatically by well known methods at the beginning of the winding of the armature or it could be connected manually after the armature is otherwise completely wound. At the end of the winding of the coil 64 there is a length of wire designated $W_1$ extending from slot 2 to the flier pulley 88.

At the same time coil 64 is wound, the coil 70 is wound in slots 14 and 10 by rotation of the left hand flier. Again the first coil lead which extends from the commutator bar 9 to slot 14 is not illustrated. Another section of wire, designated $W_2$, is shown extending from the slot 10 to the left hand flier pulley 86. After the first pair of coils 64 and 70 are wound, the wires $W_1$ and $W_2$ are extended circumferentially around the armature shaft 96 and looped about appropriate commutator tangs or hooks 102. Thus a portion of the wire $W_1$ is extended partially around the armature shaft 96 and looped about the commutator tang 102 located in alignment with slot 8 to form a finish wire lead for the coil 64 illustrated by phantom lines 104 in FIG. 3. This finish wire lead 104 is also identified in FIG. 2 as a wire lead extending from slot 2 to bar 8. Similarly a portion of the wire $W_2$ is extended around the shaft 106 to form a wire lead shown by phantom lines 106 coming out of slot 10 and going to the commutator hook 102 aligned with slot 16. Wire lead 106 is also marked in the diagram of FIG. 2.

Preferably the sections of the wires $W_1$ and $W_2$ are extended to and looped about the tangs or hooks 102 by rotating the armature, while shielding the tangs, through a point at which the wires $W_1$ and $W_2$ are immediately adjacent the tangs about which loops are to be formed. The tangs are then unshielded and the loop formed by reversely rotating the fliers and then again shielding the tangs, all as described in the said Miller patent. However, other procedures are known and may be used for accomplishing the same result. In any event, the armature 80 is ultimately rotated in the direction of the arrow in FIG. 3 to reposition the armature for receiving the next pair of coils to be wound. Contrary to established practice in the armature winding art, the second coil wound by each flier does not overlap the first coil wound by the same flier. Rather, to obtain the winding pattern of FIG. 2 the armature 80 is rotated through 180° less the number of degrees between adjacent armature slots 90. Accordingly, in FIG. 4, which shows the position of parts after the winding of the second pair of coils, it will be noted that the slots 90 are nearly 180° away from the position of the slots illustrated in FIG. 3. The second pair of coils comprises coil 68 wound by the right hand flier and coil 62 wound by the left hand flier. With reference to FIG. 2 it will be noted that these are the coils shown commutated therein. By the time the parts have reached the FIG. 4 position and as a result of the rotation of the armature 80, the coil 68 has been provided with a lead wire 108 extending from the commutator bar 8 circumferentially around the shaft 96 to the slot 13 and the coil 62 has been provided with a lead wire 72 extending around the shaft 96 to the bar 16.

The coils 62 and 68 are wound in the same direction as the coils 70 and 64, that is with the left hand flier top coming and the right hand flier top going. The next step in the winding procedure is to loop a section of the wire $W_1$ from the right hand flier pulley 88 about the hook or tang 102 at slot 15 to form the finish wire for the coil 68 shown by phantom lines 110. Simultaneously the finish wire 74 is extended to and looped about the hook or tang 102 at slot 7. The foregoing process is continued until all sixteen coils have been wound with their start and finish wires looped about appropriate commutator hooks or tangs. Throughout the winding of the armature, the looping of the wires about the tangs is always accomplished in exactly the same manner; the armature is rotated between the winding of coils through the same angle and always in the same direction; and the right hand flier is always rotated in the top going direction to wind the coils wound by it and the left hand flier rotated in the top coming direction to wind the coils wound by it. As with other double flier winding patterns, the armature is fully wound when the finish wire from one flier is connected to the same tang or hook 102 as the start wire from the other flier. The opposite ends of both wires are also connected to a common hook or tang.

Those familiar with armature winding machines will appreciate that the conventional double flier armature winder can readily be adapted for the winding of armatures in accordance with this invention. There is nothing unusual in the directions through which the flier rotates. Therefore the flier drives and controls may be entirely conventional. Also winding machines adapted to practice the method described in the aforementioned Miller patent have been developed with various types of armature rotating devices capable of rotating the armature through any desired angle.

It was noted above that the current flow in the coils of the armatures schematically illustrated in FIG. 2 is the same as that illustrated in FIG. 1. The same current flow or polarity is obtained by connecting the start and finish wire leads for each coil to electrically identical brush locations but which in FIG. 2 are 360 electrical degrees displaced from those in FIG. 1. As also will be understood by those familiar with the art, the winding schematically illustrated in FIG. 2 and shown in FIGS. 3 and 4 is "retrogressive." That is, the coils advance in overlapping fashion about the armature shaft in the opposite direction from the paths of the lead wires. If, for example, in FIG. 4 the coil 68 were located in slots 15 and 11 rather than 13 and 9, the winding would be "progressive." It can readily be demonstrated that the polarity of the armature can be reversed by changing the winding from retrogressive to progressive. The progressive winding is simply obtained by rotating the armature through 360 electrical degrees plus one slot rather than minus one slot as was the case of the retrogressive wind shown in FIGS. 2, 3 and 4.

Although the method described above has been described in connection with only a 16 slot armature, those skilled in the armature winding art will immediately recognize that basically the same procedures would be followed in winding armatures having a different number of slots. When winding "odd-slot" armatures, i.e., armatures having an odd number of coil receiving slots, the first coil is wound by one flier rotating with the other one stationary; subsequent coils are wound in pairs as is common in the winding of lap wound odd-slot armatures. However, a further complication is encountered when wave winding odd-slot armatures. If the winding forms are diametrically opposed and thereby constructed to wind aligned parallel coils, as are the coils 64 and 70, about halfway through the winding of an odd-slot armature one flier would wind a coil into the same slots as a coil previously wound by the other flier. This problem can be overcome by special tooling (not shown) including winding forms which wind coils that have axes intersecting one another at substantially 90°. Again, however, the armature is rotated about its shaft through approximately 180° after each winding cycle.

The procedures described above may be practiced with a flier type winder having only a single flier but further complications are encountered in the winding of some armatures, generally any armature having an even number of coil receiving slots that is not equally divisible by four because, after the winding of half the coils, the finish wire of a coil would fall on the same hook or tang as the start wire of the first coil. It would at that point be necessary to tie off the finish wire to that hook or tang and then start a new lead at the next adjacent hook or tang. For example, after winding seven coils of a fourteen slot, four-pole armature, the finish of that seventh coil would fall on the same tang as the start of its first coil. Therefore, an irregularity must be programmed into the machine controls to tie off the finish lead of the seventh coil and start the winding over beginning at the next adjacent tang to then complete the armature winding. Since single flier machines are generally not as efficient as double flier machines and the application of this invention to single flier winders will be readily understood by those skilled in the art, the single flier procedures are not described in detail herein.

The principles of winding six-pole armatures are the same as those involved in winding four-pole armatures, the only significant difference arising from the fact that 360 electrical degrees of a six-pole armature spans only 120 mechanical degrees rather than the 180 mechanical degrees of a four-pole armature. Therefore the six-pole armature is rotated through 120 mechanical degrees plus or minus one slot between each coil winding cycle. It should be noted here that the winding pitch of the four-pole armature coils is only approximately 90 mechanical degrees and special wire guides may be required to guide or force the coils into the bottoms of the slots. The coils of a six-pole armature span only about 60 mechanical degrees and a greater problem is encountered in getting the coils fully into the slots.

Although the presently preferred method of this invention has been described, it will be understood that within the purview of this invention various changes may be made within the scope of the appended claims.

Having thus described my invention, I claim:

1. In a method of wave winding armatures having four or more poles using a flier type armature winding machine, the improvement wherein coils successively wound by a flier are wound by the flier rotating in the same direction for each coil, the armature is rotated through 360 electrical degrees plus or minus the angle between adjacent coil receiving slots between the winding of the successively wound coils, and the lead wires are extended around the armature shaft from the finish of one coil past the start of the same coil to the start of the next succeeding coil whereupon the lead wires for each coil cross over one another, and an intermediate portion of each wire lead is looped about a commutator hook.

2. In a method of wave winding armature having four or more poles using a flier type armature winding machine having a right hand flier and a left hand flier comprising the steps of supporting an armature between the fliers, winding a pair of coils, one with each of said right and left hand fliers, rotating the armature about its axis through a total distance equal to 360 electrical degrees plus or minus the angle between adjacent armature slots, winding another pair of coils with said fliers rotated in the same direction through which they were rotated during the winding of the first pair of coils, and connecting the lead wires connected between the first coil and the second coil wound by each flier to commutator bars between the time of the winding of the first mentioned pair of coils and the winding of the second mentioned pair of coils.

3. The method of claim 2 wherein said lead wires are connected to said commutator bars by looping said lead wires completely around commutator hooks projecting from said bars.

* * * * *